United States Patent

[11] 3,619,800

[72] Inventors Evangelo Lyghounis; Giovanni Barbieri, both of Milan, Italy
[21] Appl. No. 835,189
[22] Filed June 20, 1969
[45] Patented Nov. 9, 1971
[73] Assignee Societa Italiana Telecommunicazioni Siemens S.p.A. Milan, Italy
[32] Priority June 26, 1968
[33] Italy
[31] 18230A/68

[54] PHASE-SHIFTING NETWORK FOR SINGLE-SIDEBAND MODULATION
5 Claims, 4 Drawing Figs.

[52] U.S. Cl. .................................................. 330/30 D, 330/21, 330/69, 330/126
[51] Int. Cl. .................................................. H03f 3/68
[50] Field of Search .................................................. 307/295; 330/21, 30, 30 D, 69, 126; 333/70 R; 323/119, 123, 125; 331/110, 140

[56] References Cited
UNITED STATES PATENTS

| | | | |
|---|---|---|---|
| 2,511,606 | 6/1950 | Tompkins et al. ............ | 323/123 X |
| 2,639,411 | 5/1953 | Schafer ......................... | 323/123 X |
| 3,287,628 | 11/1966 | Keiper .......................... | 307/295 X |
| 3,370,242 | 2/1968 | Offner .......................... | 330/30 X |

*Primary Examiner*—Roy Lake
*Assistant Examiner*—James B. Mullins
*Attorney*—Karl F. Ross

ABSTRACT: Two phase-shifting networks of identical construction, differing only in the magnitudes of their impedances, comprise each two L-sections with partly capacitive series arms and resistive shunt arms working into a differential amplifier to generate, in response to an input voltage applied to both networks in parallel, two output voltages maintaining a constant amplitude and phase relationship through a wide band of frequencies; the two L-sections of each network, connected in parallel to a common voltage source, differ from each other by the presence of a series condenser in one L-section.

INVENTORS:
Evangelo Lyghounis
Giovanni Barbieri
BY
Karl F. Ross
Attorney

PHASE-SHIFTING NETWORK FOR SINGLE-SIDEBAND MODULATION

Our present invention relates to a signal-splitting circuit arrangement of the type wherein two phase-shifting networks are connected in parallel across a source of input voltage of variable frequency for deriving therefrom two related output voltages of substantially invariable phase and amplitude relationship throughout the operating frequency band.

Such systems are utilized, for example, in single-sideband modulators requiring the presence of two identical signal voltages in quadrature with each other. The goal of maintaining a constant relative phase shift between two otherwise identical signals, of widely varying frequency, has heretofore been realized only imperfectly with lattice-type passive networks of symmetrical configuration including series and shunt arms of mutually inverted reactances to provide a purely resistive, frequency-independent characteristic impedance along with a phase angle which increases progressively throughout the operating frequency band. If this band is to extend to a range of low frequencies, the required inductances are difficult to realize with the necessary precision. An alternative solution of the prior art, therefore, resides in the use of passive resistance/capacitance networks; especially with wide frequency bands, however, the losses of such networks are considerable.

Moreover, the input and output impedances of conventional phase-shifting networks are unsatisfactory for direct utilization between a voltage source and a load so that input and output transformers are generally required to act as impedance converters. These transformers must be of inconveniently large dimensions if the frequency ratio between the upper and lower limits of the operating band is high.

With these known expedients, it was heretofore possible to generate paired output signals with a phase difference whose magnitude oscillated throughout an extended frequency band between certain limits; through the use of a sufficiently large number of cascaded loops of such passive networks, the spread of these limits could be reduced to a tolerable value.

The general object of our present invention is to provide a network for the aforestated purpose which is of simpler construction than prior-art circuits while maintaining a virtually perfect constancy of phase shift and proportionality (or identity) of amplitudes throughout a wide frequency band.

A more particular object of this invention is to provide a network of this description which dispenses with the need for using input and output transformers.

In conformity with out invention, we replace the passive networks of prior art phase shifters by active networks each comprising a differential amplifier whose two inputs are fed from a common voltage source by way of respective L-sections each including a partly capacitive series arm and a substantially wholly resistive shunt arm; upon proper choice of the magnitudes of the impedances of the similarly constructed networks, the desired phase and amplitude relationship between their respective output voltages will be maintained with high accuracy throughout a desired frequency band.

The invention will be described in greater detail hereinafter with reference to the accompanying drawing in which.

Figure 1:
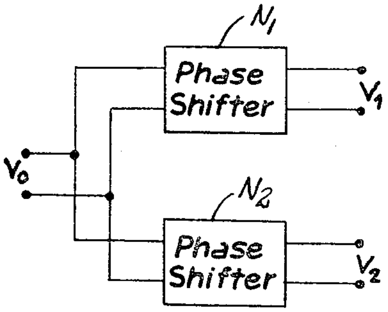
FIG. 1 is a block diagram of a signal-splitting circuit arrangement of the type herein contemplated.

In FIG. 1 we have shown a conventional signal splitter for single-sideband modulation, comprising a pair of parallel phase-shifting networks $N_1$, $N_2$ connected in parallel across a source of input voltage $V_o$ and delivering a pair of output voltages $V_1$, $V_2$ which should maintain, over a predetermined frequency band, a constant phase difference (usually of 90°) and an invariable amplitude ratio (preferably 1:1).

Figure 2:
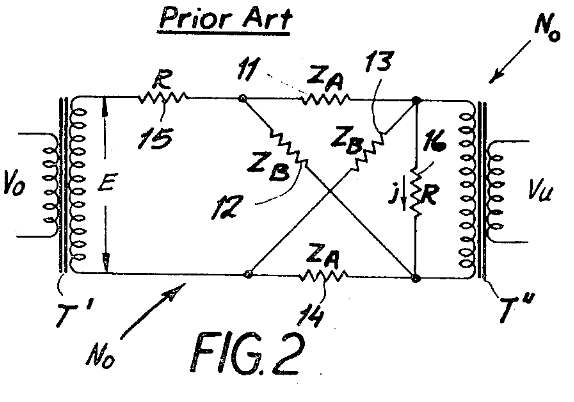
FIG. 2 is a circuit diagram of a conventional passive network forming part of the system of FIG. 1.

FIG. 2 shows a network $N_o$, representative of either of the two networks $N_1$, $N_2$ of FIG. 1, which is typical of prior art circuitry and comprises a lattice section formed from two pairs of impedance arms 11, 12 and 13, 14 of magnitudes $Z_A$, $Z_B$; the two mutually identical impedances $Z_A$ and the two mutually identical impedances $Z_B$ may also be regarded as pairs of opposite arms of a bridge circuit. The network further includes a pair of identical resistances 15, 16 of magnitude R, one connected in series with the lattice section on its input side and one connected across that section on its output side. An input voltage E, derived from supply voltage $V_o$ (FIG. 1) through an input transformer T′, is converted thereby into an output voltage $V_u$, to be translated into a load voltage $V_1$ or $V_2$ (FIG. 1) by an output transformer T″.

If $i$ denotes the output current flowing through resistance 16, the function $V_u/E$ $F(j\omega)=Ri/E$ can be expressed according to known theorems as $$\frac{V_u}{E}=\frac{R}{2}\left[\frac{1}{Z_A+R}-\frac{1}{Z_B+R}\right] \tag{1}$$

with the choice of $Z_A$ and $Z_b$ determining the response characteristic of the network (including the location of its poles and nodes).

In accordance with our present invention, we realize an analogous function with the aid of an active network N as shown in FIG. 3, this network being again representative of either of the two parallel networks $N_1$, $N_2$ illustrated in FIG. 1. Network N comprises a differential amplifier D with two input terminals 21, 22 connected across a common voltage source 20, generating the input voltage $E$, by way of two L-sections 21, 22. L-section 21 consists of a series arm 23 and a shunt arm 24; L-section 22 similarly consists of a series arm 25 and a shunt arm 26. Arms 23, 25 are partly capacitive and have respective impedances $Z_A$, $Z_B$ varying with frequency; arms 24, 26 are substantially purely resistive and have the same frequency-independent resistance $R$. The individual output voltages $V_1'$, $V_2'$ of sections 21 and 22 are combined by the differential amplifier D into a resulting output voltage $V_u$.

Figure 3:
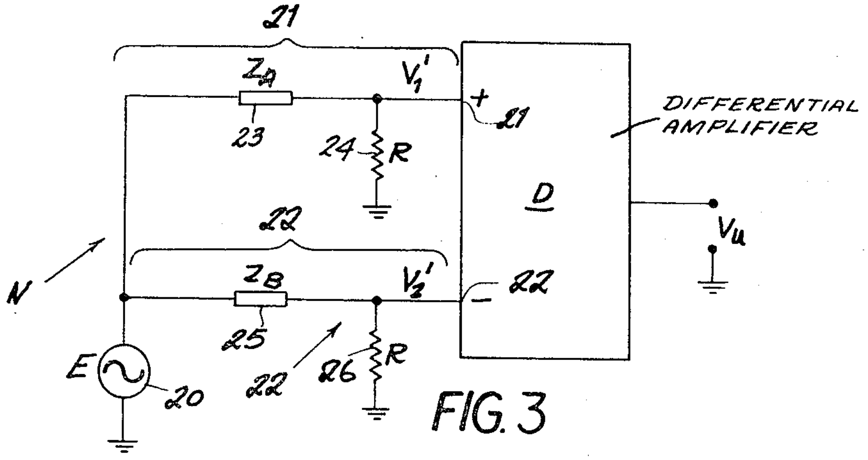
FIG. 3 is a circuit diagram, partly in block form, of an improved network in accordance with our present invention, designed to replace the one shown in FIG. 2 in the system of FIG. 1.

Theoretical considerations show that the ratio $V_u/E$ in the network of FIG. 3 is given by the relationship $$\frac{V_u}{E}=K\left[\frac{1}{Z_A+R}-\frac{1}{Z_B+R}\right] \tag{2}$$

where $K$ is a constant but which is otherwise identical with formula (1) even though the pairs of impedances of magnitudes $Z_A$ and $Z_B$ in networks $N_o$ (FIG. 2) have been replaced by single impedances in network N (FIG. 3). The input and output transformers T′, T″ have been omitted, with amplifier D directly providing the requisite high input impedance and low output impedance.

Figure 4:
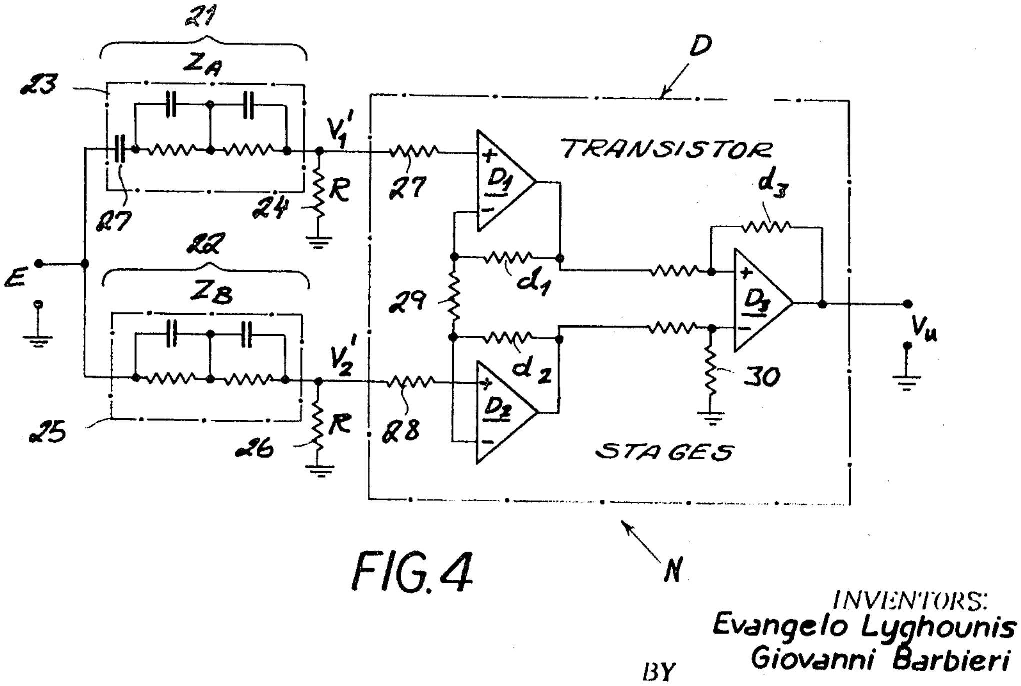
FIG. 4 is a more detailed circuit diagram of the network of FIG. 3.

Details of a preferred construction of network N have been illustrated in FIG. 4 which shows the series arms 23, 25 as comprising each a pair of R–C sections connected in cascade, arm 23 further including a capacitance 27 in series with the parallel combination of resistors and condensers. Amplifier D consists of an ancillary stage, formed by two preamplifier elements $D_1$, $D_2$, and a main stage formed by an amplifier element $D_3$ whose two inputs (+ and −) receive the outputs of preamplifiers $D_1$ and $D_2$, respectively. All these amplifier elements may be of the integrated type and are shown provided with individual degenerative feedback connections $d_1$, $d_2$, $d_3$ designed to stabilize their respective outputs against variations with aging or ambient conditions. They may be represented by NPN transistors, with the bases (+) of elements $D_1$ and $D_2$ connected to the outputs of sections 21 and 22 through respective resistors 27, 28 and with their emitters (−) interconnected by a common resistor 29 across which the feedback voltage from paths $d_1$ and $d_2$ is developed. A similar resistor 30, which lets the amplifier $D_3$ operate with a self-biasing emitter (i.e. with a variable emitter potential following that of the base), helps increase the input impedance of unit D.

With the use of two such networks in a circuit arrangement as illustrated in FIG. 1, designed to operate in a frequency range from 40 Hz. to 15,000 Hz., a 90° phase displacement between output voltages $V_1$ and $V_2$ could be maintained with a maximum deviation of not more than about 15′ (¼°). Such a system was found most effective in suppressing the image bands in single-sideband modulation for multifrequency transmission of audio signals, especially for stereophonic music.

Naturally, the basic networks herein disclosed may be modified in various ways, e.g. by interposition of further amplifier stages.

We claim:

1. A signal-splitting circuit arrangement comprising a source of input voltage of variable frequency within a predetermined band and a pair of phase-shifting networks connected in parallel across said source for generating respective output voltages of substantially invariable amplitude and phase relationship throughout said band, each of said networks comprising:

input terminals connected to receive said input voltage;

a pair of L-sections each having a series arm with parallel resistive and capacitive branches and a substantially wholly resistive shunt arm forming a junction with said series arm;

and a differential amplifier connected across the junctions of said L-sections for converting said input voltage into a respective output voltage.

2. A circuit arrangement as defined in claim 1 wherein said amplifier comprises a main stage with two inputs and an ancillary stage including a pair of preamplifiers respectively working into said inputs.

3. A circuit arrangement as defined in claim 2 wherein said preamplifiers and said main stage are individually provided with stabilizing feedback connections.

4. A circuit arrangement as defined in claim 1 wherein one of the series arms of each network further comprises a capacitor in series with the parallel combination of said branches thereof.

5. A circuit arrangement as defined in claim 1 wherein said amplifier comprises a transistor stage with a self-biasing emitter.

* * * * *